United States Patent [19]

Jenkins

[11] Patent Number: 5,379,354
[45] Date of Patent: Jan. 3, 1995

[54] INTENSITY DIVIDING MULTIMODE WAVE GUIDE DEVICE FOR PRODUCING INTENSITY DISTRIBUTION MAXIMA

[75] Inventor: Richard M. Jenkins, Worcester, United Kingdom

[73] Assignee: The Secretary of State for Defence in Her Britannic Majesty's Government of the United Kingdom and Northern Ireland, United Kingdom

[21] Appl. No.: 64,043
[22] PCT Filed: Dec. 2, 1991
[86] PCT No.: PCT/GB91/02131
 § 371 Date: May 20, 1993
 § 102(e) Date: May 20, 1993
[87] PCT Pub. No.: WO92/11554
 PCT Pub. Date: Jul. 9, 1992

[30] Foreign Application Priority Data

Dec. 20, 1990 [GB] United Kingdom ................. 9027658

[51] Int. Cl.⁶ .............................................. G02B 6/26
[52] U.S. Cl. .................................... 385/46; 385/24; 385/27; 385/28; 385/39; 385/48
[58] Field of Search ................. 385/15, 27, 5, 28, 29, 385/24, 39, 42, 43, 44, 45, 46, 47, 48, 129, 130, 131, 132, 125; 250/227.11, 227.23

[56] References Cited

U.S. PATENT DOCUMENTS

| | | | |
|---|---|---|---|
| 3,750,183 | 7/1973 | Drabowitch | 343/786 |
| 3,832,029 | 8/1974 | Bryngdahl | 385/116 X |
| 4,087,159 | 5/1978 | Ulrich | 385/130 X |
| 4,150,870 | 4/1979 | d'Auria | 385/44 X |
| 4,950,045 | 8/1990 | Bricheno et al. | 385/24 X |
| 4,952,018 | 8/1990 | Young et al. | 385/44 X |
| 4,975,237 | 12/1990 | Brown | 356/338 |
| 4,991,926 | 2/1991 | Pavlath | 385/27 X |
| 5,077,814 | 12/1991 | Shigematsu et al. | 385/28 X |
| 5,099,114 | 3/1992 | Matsumoto et al. | 250/227.23 |
| 5,136,671 | 8/1992 | Dragone | 385/46 |
| 5,138,675 | 8/1992 | Schofield | 385/28 |
| 5,208,885 | 5/1993 | Dragone et al. | 385/49 |
| 5,224,193 | 6/1993 | Risk | 385/28 X |
| 5,239,598 | 8/1993 | Wight et al. | 385/8 |
| 5,243,672 | 9/1993 | Dragone | 385/46 |

FOREIGN PATENT DOCUMENTS

| | | | |
|---|---|---|---|
| 0330457A3 | 8/1989 | European Pat. Off. | 385/39 X |
| 0330457 | 8/1989 | European Pat. Off. | 385/44 X |
| 0330539 | 8/1989 | European Pat. Off. | 385/147 X |
| 0395060 | 10/1990 | European Pat. Off. | 250/227.23 X |
| 2634288 | 1/1990 | France | 385/24 X |
| 59-195618 | 11/1984 | Japan | 385/46 X |
| 1525492 | 9/1978 | United Kingdom | 385/116 X |
| 2207525A | 2/1989 | United Kingdom | 385/46 X |

OTHER PUBLICATIONS

Simon et al.; Applied Physics Letters, vol. 31, No. 2, Jul. 1977; "Fiber-optical interferometer"; pp. 77-79.
(List continued on next page.)

Primary Examiner—Brian Healy
Attorney, Agent, or Firm—Nixon & Vanderhye

[57] ABSTRACT

An intensity dividing device (10) incorporates a rectangular multimode waveguide (20) connected to an input waveguide (18) and a set of four output waveguides (22). The input waveguide (18) provides a fundamental mode input excitation of $CO_2$ laser radiation to the multimode waveguide (20). The input waveguide (18) is offset from the multimode waveguide longitudinal axis (24). Consequently, both symmetric and antisymmetric modes of the multimode waveguide (20) are excited. Modal dispersion along the multimode waveguide produces electric field intensity maxima of differing magnitude centred on respective output waveguides (22). This provides division of the input radiation into a range of differing intensity outputs.

9 Claims, 8 Drawing Sheets

OTHER PUBLICATIONS

Niemeier et al.; Optics Letters, vol. 11, No. 10, Oct. 1986; "Quadrature outputs from fiber interferometer with 4×4 coupler"; pp. 677–679.

Croston et al.; IEEE Photonics Technology Letters, vol. 2, No. 10, Oct. 1990; "A Highly Dispersive Wavelength Division Demultiplexer in InGaAlAs-InP for 1.5 μm Operation"; pp. 734–737.

Drabowitch; Microwave Journal, vol. 9, No. 1, Jan. 1966; "Multimode Antennas"; pp. 41–51.

Laakmann et al.; Applied Optics, vol. 15, No. 5, May 1976; "Waveguides: characteristic modes of hollow rectangular dielectric waveguides"; pp. 1334–1340.

Bryndahl; *Journal of the Optical Society of America*, vol. 63, No. 4, Apr. 1973; pp. 416–419.

Fielding et al.; European Conference on Optical Communications, 1989, pp. 17–21.

Ikegami et al; *Physics World*, 91/91; "Passive Paths for Networks" pp. 50–54.

Jansen et al.; *Applied Physics Letter* 55 (19), Nov. 1989; "Diffraction-limited Operation from Monolithically integrated diode laser array and self-imaging (Talbot) cavity"; pp. 1949–1551.

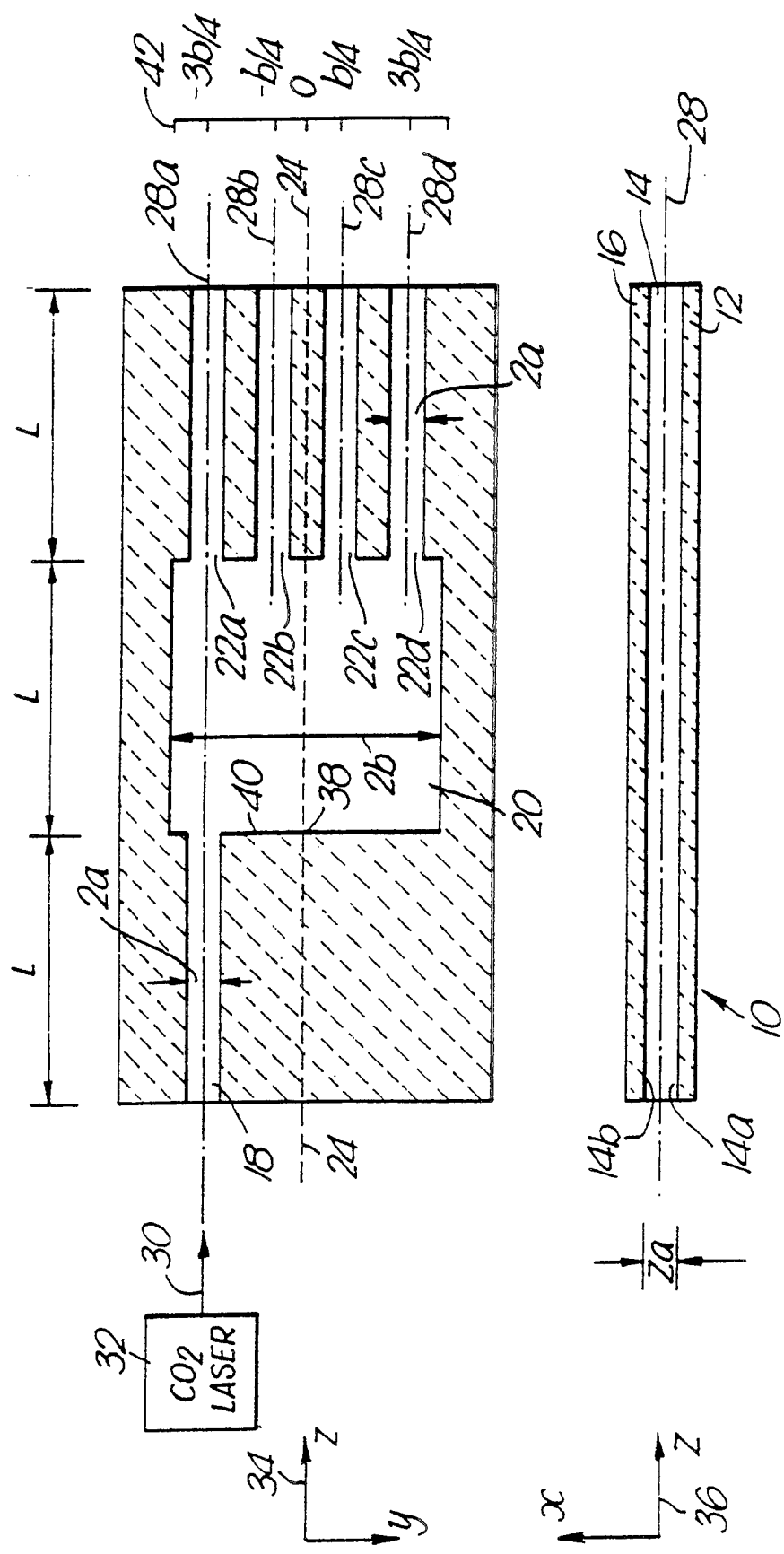

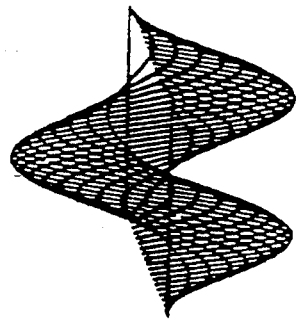
FIG. 3C
m=3; n=1
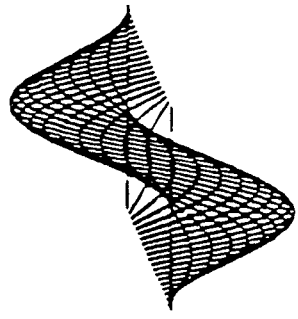
FIG. 3B
m=2; n=1
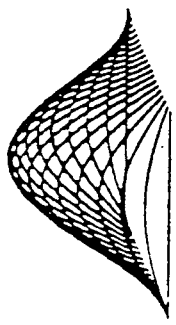
FIG. 3A
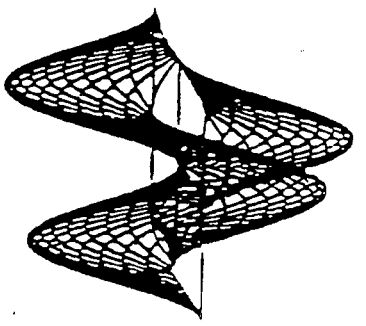
FIG. 3F
m=2; n=2
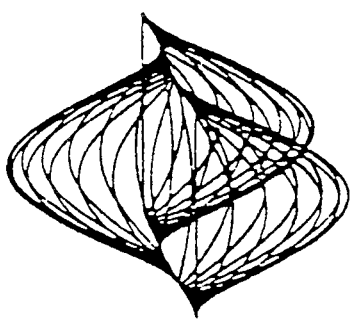
FIG. 3E
m=1; n=3
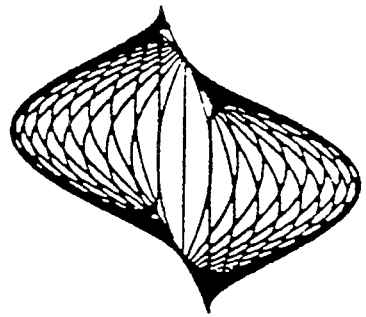
FIG. 3D
m=1; n=2
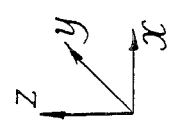
FIG. 3G  m=1; n=1

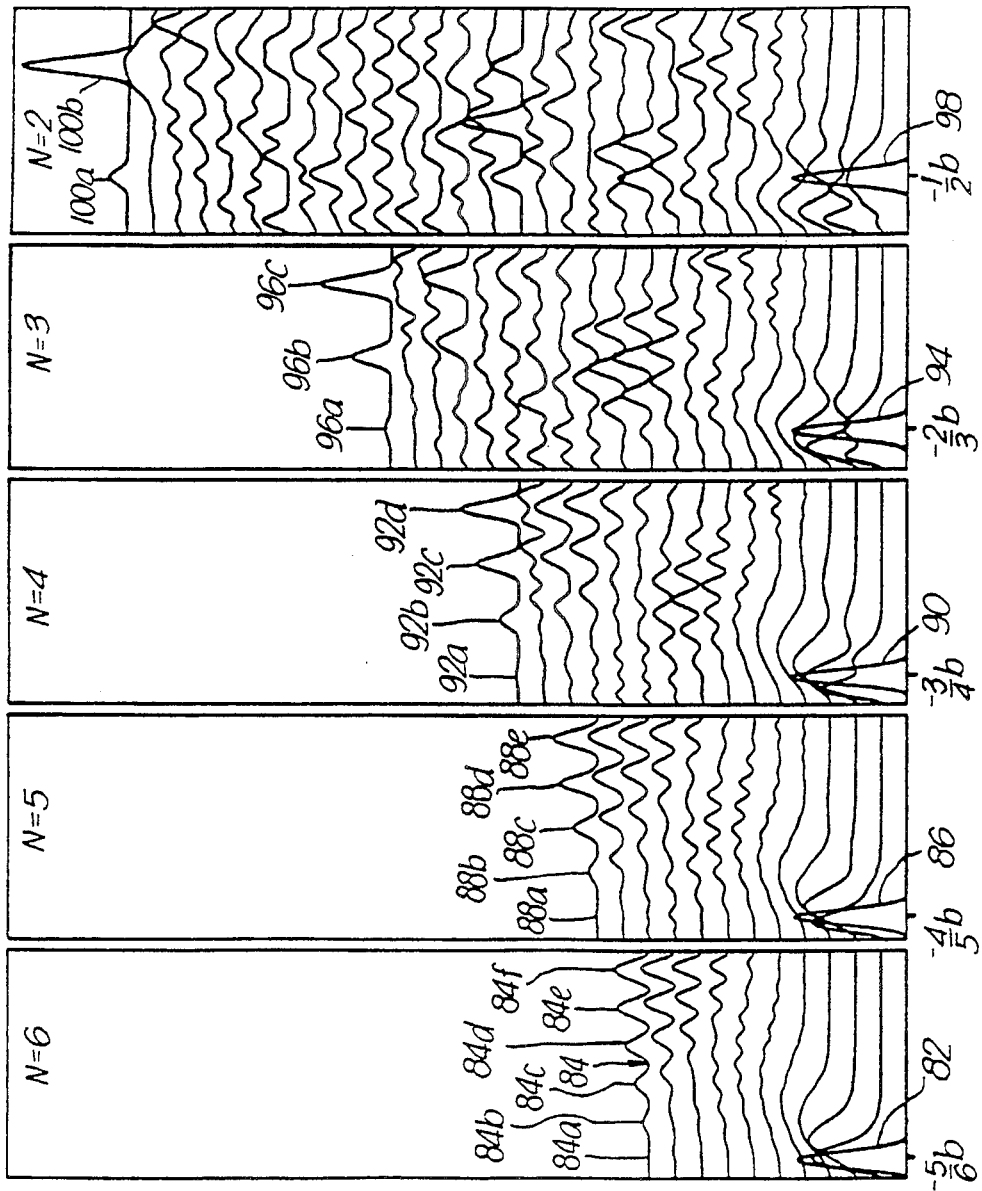

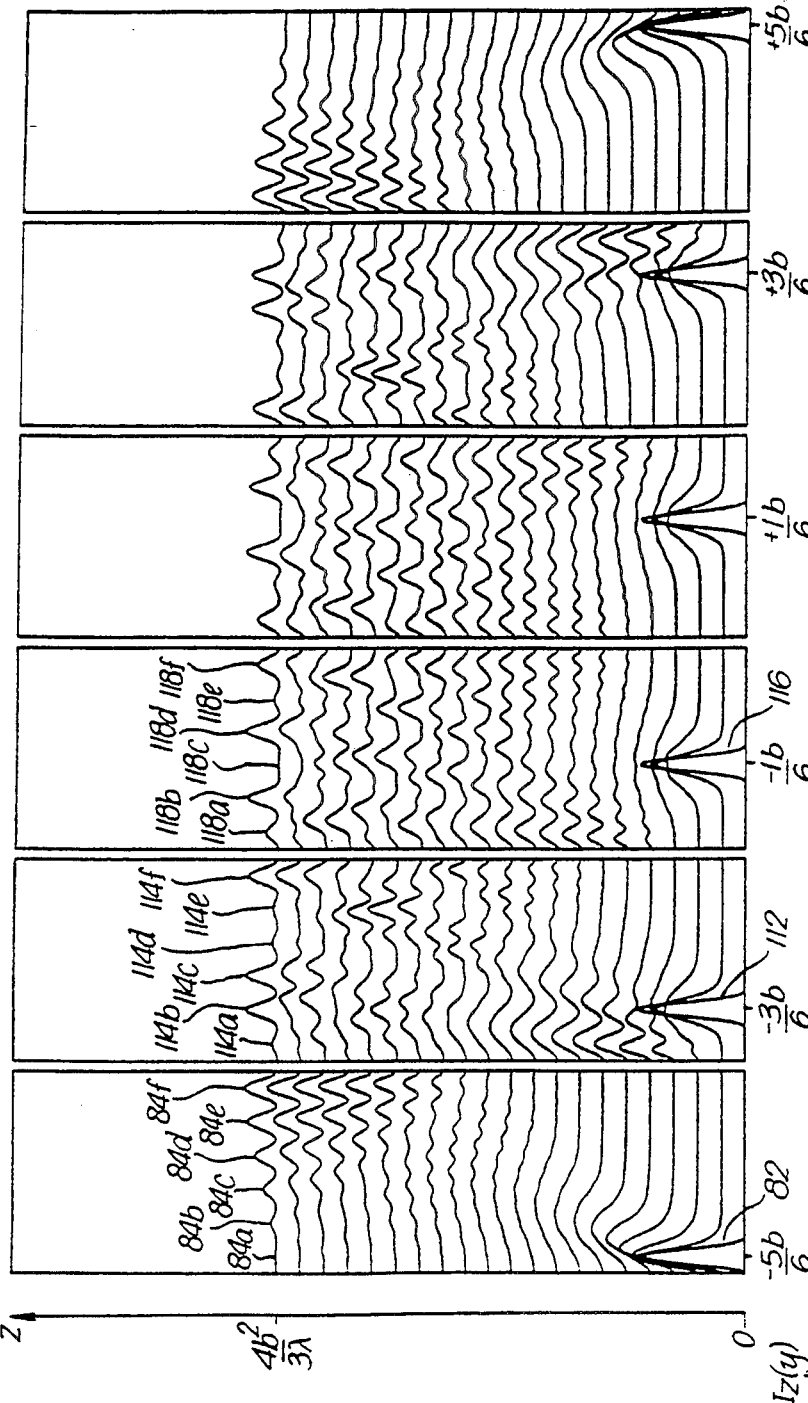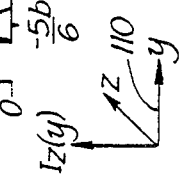

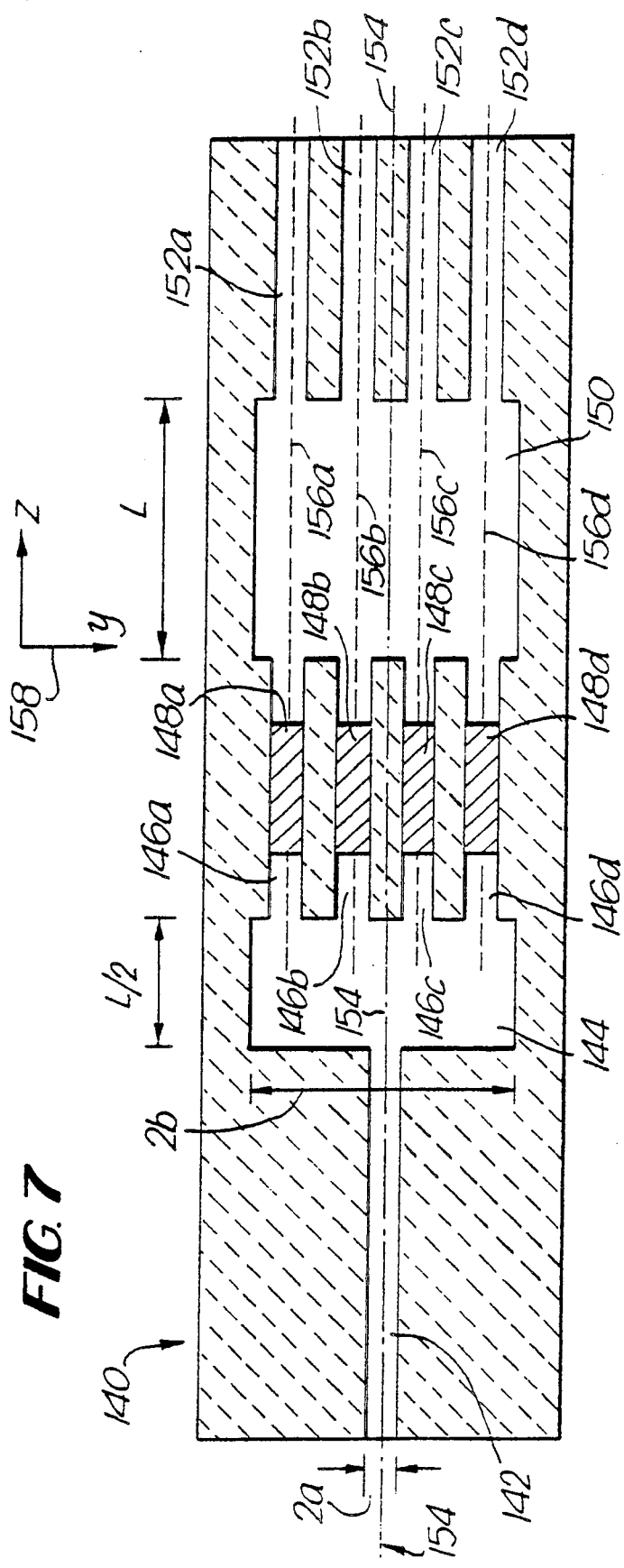

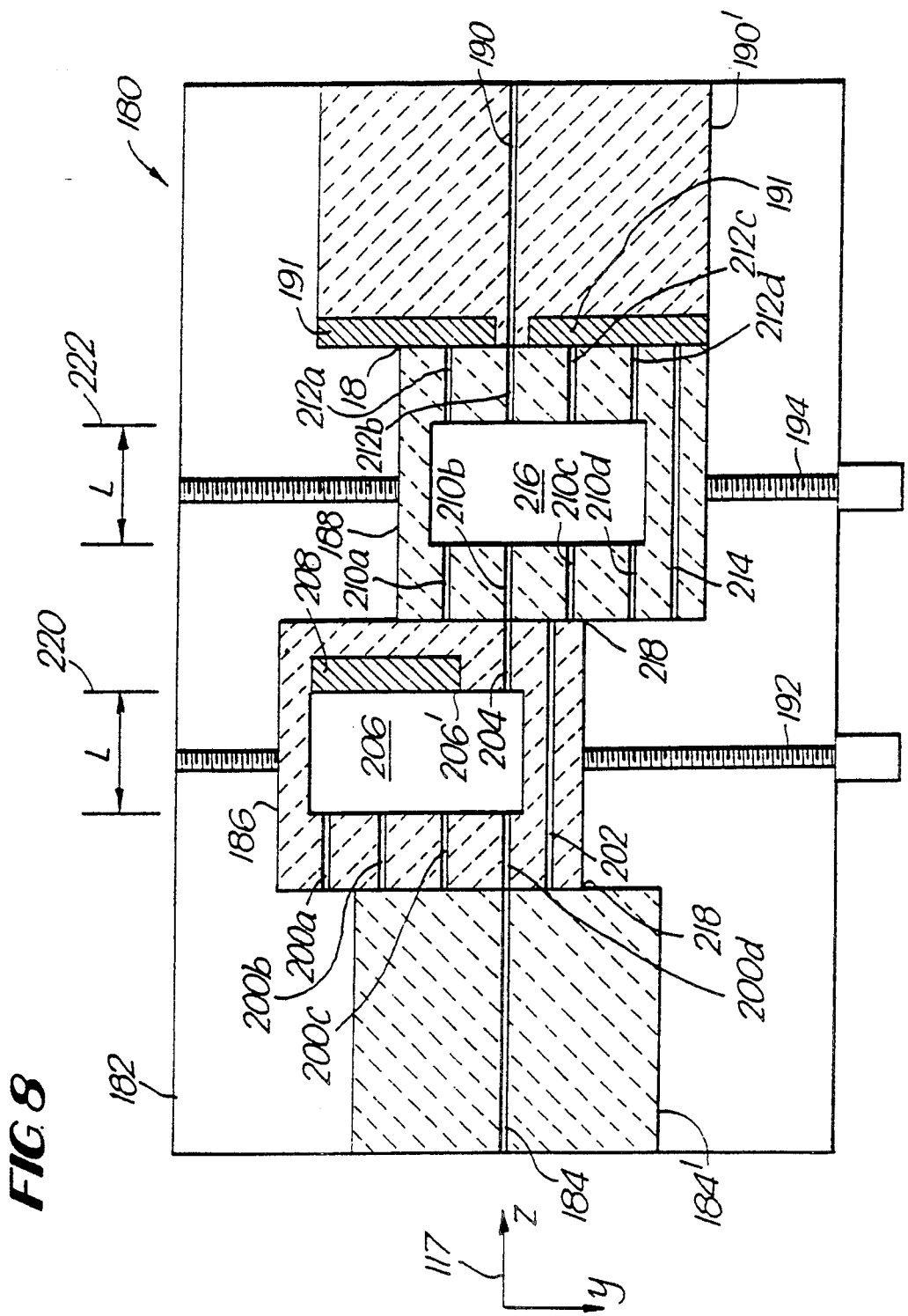

INTENSITY DIVIDING MULTIMODE WAVE GUIDE DEVICE FOR PRODUCING INTENSITY DISTRIBUTION MAXIMA

BACKGROUND OF THE INVENTION

1. Field of the Invention

This invention relates to an intensity dividing device for use in division of radiation.

2. Discussion of Prior Art

Radiation intensity dividing devices are known, such as for example optical fibre Y-junctions. Y-junctions may be symmetrical, for division of one input beam into two substantially equal intensity beams. Such devices are discussed by Z. Weissman, A. Hardy and E. Marom in "Mode-Dependent Radiation Loss in Y Junctions and Directional Couplers", IEEE Journal of Quantum Electronics, Vol 25, No 6 (1989) pp 1200-1208. Active symmetric Y-junctions which employ electro-optic effects to achieve asymmetric splitting are also known. An example is described by H. Sasaki and I. Anderson in "Theoretical and Experimental Studies on Active Y-Junctions in Optical Waveguides", IEEE Journal of Quantum Electronics, Vol QE-14, No 11 (1978) pp 883–892. However, symmetrical Y-junctions, both active and passive, suffer from high losses, particularly for split angles greater than a few degrees.

Asymmetric Y-junctions capable of dividing an input beam into two beams of differing intensities are also known. One such device is described by K. Shirafuji and S. Karazono in "Transmission Characteristics of Optical Asymmetric Y Junction with a Gap Region", Journal of Lightwave Technology, Vol 9, No 4 (1991) pp 426–429. It is considerably more efficient than more conventional Y-junctions since it uses total internal reflection to redirect radiation to one of the two output parts. Radiation reaches the other output port by coupling across a gap. This radiation is not deviated from the input direction of propagation. The power splitting ratio is determined by the width of the gap.

All Y-junctions, however, suffer from the disadvantage that they can only provide two way splitting. Therefore, to achieve higher order splitting Y-junctions are used in series, thus multiplying the losses incurred at each stage.

Many other forms of intensity dividing device are also known. In International Patent Application No. PCT/US89/00190, published under International Publication No. WO 89/06813 E. Kapon describes optical waveguide junctions. One incorporates a single input waveguide with four single mode output waveguides of differing widths and/or differing refractive indices, radiating from an end. The output waveguides are therefore characterised by different propagation constants. For a given input wavelength, different modes of the input waveguide will couple to different output waveguides, as a result of the different propagation constants. However, this is an inefficient device with high transmission losses, since energy from each mode will in general enter each output waveguide but will be lost from those with unfavourable propagation constants.

An alternative device described by E. Kapon incorporates four single mode input waveguides of differing widths and/or refractive indices, converging into an area from which three single mode output waveguides radiate. The modes excited in the common area are dependent on which input waveguides are providing radiation beams. The output waveguides operate as described for the single input devices. These devices enable radiation to be divided according to the ratio of excitation of modes in the waveguides feeding the output waveguides. However, as previously stated they are highly inefficient.

In U.S. Pat. No. 4,693,546 J. P. Lorenzo and R. A. Soref describe a "Guided Wave Optical Power Divider". It is in the form of an X-junction. Two input waveguides converge on an input end of a crossover region and two output waveguides diverge from an output end of the region. The input and output waveguides are single mode and of width W. The crossover region supports two modes, one odd and one even, and is of width 2 W. The device is formed from crystalline silicon and the crossover region is doped. In an undoped device radiation passes through the crossover region substantially undeviated, and enters the first output waveguide. In a doped device waveguide modes are perturbed and a fraction of the input radiation is deviated whilst passing through the crossover region and enters the second output waveguide. The proportion of light deviated is determined by the level of doping and may be in the range 10 to 20%. Lorenzo and Soref do not mention the losses suffered in these devices, other than to state that the addition of dopants increases absorption by a small amount.

In order to produce more complex devices a number of the X-junctions are combined. They may, for instance, be used to form a predetermined optical signal distribution network. However, such networks are quite complex, for even a modest number of inputs and outputs.

Another form of intensity dividing device is described by A. Mahapatra and J. M. Connors in European Patent Application 88108258.0, Publication No 0 301 194. The devices described incorporate one or more input channels, and a number of output channels, provided on opposite sides of a planar waveguide. Essentially, radiation input to the planar waveguide fans out and is thus incident on apertures of the output waveguides. The patent application describes how the devices may be constructed to improve uniformity of coupling. That is to obtain substantially equal intensity in each of the output waveguides. These devices will be inherently inefficient, since much of the radiation input to the planar waveguide will be incident on portions of waveguide wall between output waveguide apertures. As a result it will either be absorbed or reflected back to interfere with radiation in the planar waveguide.

Yet another form of device is described by T. P. Young and I.R. Croston in UK Patent Application 2 215 482A, which is entitled "Optical In-line filter". It incorporates a first multimode waveguide whose output end is coupled to an open end of a second, narrower waveguide. The coupling and the length of the first waveguide being such that light entering the first waveguide undergoes interference between at least two of its modes. This causes light from the first waveguide of a predetermined waveband, or wavebands, only to enter the second waveguide. Light of other wavebands is provided with alternative means by which it may leave the first waveguide. Thus the device is capable of separating one waveband (or a set of harmonic wavebands) from others using modal dispersion. It thereby divides the intensity of the input radiation, but that is purely a by-product of the purpose of the device, the proportions of power in the various output beams are determined by the proportions of different wavelengths in the input beam. There is no means by which the contribution from one wavelength may be divided.

A further form of waveguide intensity dividing device using modal dispersion is described in UK Patent No. 1 525 492 entitled "Self Imaging System Using a Waveguide". This describes many different devices using multimode waveguides supporting at least fifty modes. FIG. 33(a) illustrates a device for dividing a single input image into a number of identical images of differing intensities. An input waveguide feeds an image into a first rectangular waveguide, of width $\omega_z$ and length L. A large number of modes are excited in the first rectangular waveguide, modal dispersion occurs and after a length L five images, each substantially one fifth the intensity of the input image, are produced. Three of the five images pass to a second rectangular waveguide of width $\omega_z'$ and length L', whilst the remaining two pass to a third rectangular waveguide of width $\omega_z''$ and length L''. Modal dispersion also occurs in the second and third rectangular waveguides. Thus after a length L' the three images are recombined. Likewise after a length L'' the two images are recombined. The second and third rectangular waveguides each feed an output waveguide of like dimensions to the input waveguide. The images entering these waveguides have intensities in the ratio 3:2.

The device described in UK Patent No. 1,525,492 is more efficient than previously described prior art devices. However it suffers from a number of disadvantages. It requires waveguides capable of supporting a large number of modes, and these are difficult to produce. In addition it is fairly complex, and inconveniently long for many applications.

SUMMARY OF THE INVENTION

It is an object of the invention to provide an alternative intensity dividing device capable of producing a set of different intensity outputs from input radiation. The present invention provides an intensity dividing wherein:

(A) the device includes:
(a) a multimode waveguide,
(b) at least one input port arranged to relay input radiation of a single wavelength to excite both symmetric and antisymmetric modes of the multimode waveguide, and
(c) a set of output ports which are spaced apart across a transverse section of the multimode waveguide; and (B) the multimode waveguide and the input and output ports have geometries and a spatial relationship therebetween which are in combination arranged such that input radiation propagating as a fundamental mode to the multimode waveguide would, due to modal dispersion, produce intensity distribution maxima of differing magnitude at respective output ports, each maximum being substantially a reproduction of the input radiation fundamental mode.

The invention provides the advantage that it provides radiation division into unequal intensity outputs, and is capable of high efficiency if correctly made. It is applicable inter alia to light beating equipment requiring a low intensity beam for use as a local oscillator and a high intensity beam for output to and backscattering or reflection from a sample or region under investigation.

The invention may incorporate a set of input ports, and the input and output ports may be connected to input and output waveguides respectively. The input waveguides may contain phase shifters, and be arranged to receive like intensity radiation. In this case, the phase shifters are controllable to vary intensity levels received by respective output waveguides.

The invention may include a second multimode waveguide with associated input and output ports, this waveguide being arranged in series with the multimode waveguide referred to above. In this case, the two multimode waveguides are arranged to apply two successive stages of selectable intensity division to radiation propagating between a device input and a device output.

BRIEF DESCRIPTION OF THE DRAWINGS

In order that the invention might be more fully understood, embodiments thereof will now be described, by way of example only, with reference to the accompanying drawings, in which:

FIGS. 1 and 2 are respectively horizontal and vertical sectional views of an intensity dividing device of the invention;

FIGS. 3A–3G shows modal amplitude distributions for various lower order waveguide modes;

FIGS. 5(a)–5(f) illustrates changes in transverse electric field intensity distribution with distance along a multimode waveguide, for division of a single input into N maxima, where N is (a) 6, (b) 5, (c) 4, (d) 3 and (e) 2;

FIGS. 6(a)–6(g) illustrates changes in transverse electric field intensity distribution with distance along a multimode waveguide, for division of a single input into 6 maxima, where each of (a) to (f) corresponds to a different input location;

FIG. 7 is a schematic sectional plan view of an electro-optically programmable device of the invention;

FIG. 8 is a schematic sectional plan view of a device of the invention incorporating cascaded, transversely movable multimode waveguides.

DETAILED DISCUSSION OF PREFERRED EMBODIMENTS

Figure 4B:
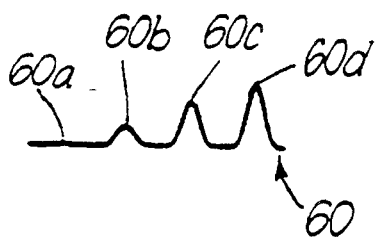
FIGS. 4A–4C illustrates changes in transverse electric field intensity distribution with distance along a multimode waveguide.

Referring to FIGS. 1 and 2, an intensity dividing device of the invention indicated generally by 10 is shown in a sectional plan view and a sectional side view respectively. It is in the form of a beamsplitter, and it incorporates three layers or strata 12, 14 and 16. The strata 12 to 16 are lower, central and upper layers respectively. The lower and upper layers 12 and 16 are continuous sheets of alumina. The central layer 14 is a sheet of like material which has been milled to provide slots through its thickness. Slot sides so formed provide waveguide sidewalls. The lower and upper sheets provide lower and upper waveguide walls.

FIG. 1 is a horizontal section through the central layer 14 parallel to its surfaces 14a and 14b. The slotting defines an input waveguide 18, a beamsplitting waveguide 20 and a set of four output waveguides 22a to 22d (referred to collectively as 22).

The beamsplitter 10 has a center longitudinal axis 24 (dotted line), and the output waveguides 22 have respective longitudinal axes 28a to 28d (chain lines). The axes 24 and 28 are coplanar and parallel. In FIG. 2, the axes appear superimposed, the latter being referred to collectively as 28.

The input waveguide 18 is coaxial (axis 28a) with an outermost output waveguide 22a. It receives input radiation 30 of 10.59 μm wavelength from a $CO_2$ laser 32. The laser 32 is focussed to a beam waist of diameter equal to 1.42a between $1/e^2$ intensity points. The beam waist is located at the centre of the left hand (input) end of the input waveguide 18. The laser beam waist profile in planes perpendicular to the axis 24 is Gaussian.

The input and output waveguides 18 and 22 are all of square transverse cross-section with side 2a. The beamsplitting waveguide 20 is of height 2a and width 2b. The parameters a and b are employed to preserve generality and assist mathematical analysis. In one embodiment of the invention, 2a = 1 mm and 2b = 8a = 4 mm. The waveguides 18, 20 and 22 are each of length L, given by:

$$L = 2nb^2/\lambda_o \quad (1)$$

where:

n = refractive index of waveguide core material, i.e. air in the waveguides 12, 20 and 22;

b = beamsplitting waveguide half width as defined above, and $\lambda_0$ = free space operating wavelength = 10.59 μm for the $CO_2$ laser 32.

Alternatively, replacing $n/\lambda_0$ by $\lambda$, the operating wavelength in the beamsplitting waveguide, Equation (1) becomes:

$$L = 2b^2/\lambda \quad (2)$$

with 2b = 4 mm and $\lambda$ = 10.59 μm, L = 755 mm. It should, however, be noted that the lengths of waveguides 18 and 22 are not of great significance to the operation of the device 10. They were chosen to be of length L purely for simplicity of description and construction.

Coordinate axes 34 and 36 are shown in FIGS. 1 and 2 respectively, these defining yz (horizontal) and xz (vertical) planes. The z axis is the central longitudinal axis 24; x, y and z are defined as zero at 38 where the axis 24 intersects a left hand transverse wall 40 of the beamsplitting waveguide 20.

The locations of the waveguide axes 28, i.e. their offsets in the y direction with respect to the z axis 38, are shown on a scale 42. The axes 28a to 28d have y coordinates −3b/4, −b/4, +b/4 and +3b/4 respectively. The beamsplitting waveguide 20 may be notionally treated as divided longitudinally into quarters bounded by axes (not shown) with y coordinates −b, −b/2; −b/2, 0; 0, +b/2; and +b/2, +b. The axes 28 are therefore located periodically in space across the horizontal transverse y dimension of the beamsplitting waveguide 20. They are located centrally of respective waveguide quarters. In general, and in accordance with the invention, it can be shown that input and output waveguides, i.e. coupling waveguides, should have axes located centrally of respective equal subdivisions of the beamsplitting waveguide's transverse cross-section. In a device of the invention having N output guides, the latter would be located centrally of respective beamsplitting waveguide cross-sectional Nths.

The theoretical propagation characteristics of a rectangular waveguide will now be briefly analysed. It is assumed that the waveguide has height 2a, width 2b and is bounded by a homogeneous dielectric material with complex dielectric constant $\epsilon$. It is also assumed that this dielectric material (which provides the waveguide walls) is highly reflecting and not significantly attenuating for required propagating modes. The waveguide has height, width and length dimensions which are parallel to the x, y and z axes respectively. It has normalised linearly polarized modes of the kind $EH_{mn}$. The electric field contribution $E_{mn}(x,y,z)$ of the mnth mode $EH_{mn}$ at the point (x,y,z) has been calculated by Laakmann et al in Appl. Opt. Vol. 15, No. 5, pages 1334–1340, May 1976 as follows:

$$E_{mn}(x,y,z) = \frac{1}{\sqrt{(ab)}} \left[ \begin{array}{c} \cos \\ \sin \end{array} \left( \frac{m\pi x}{2a} \right) \right] \left[ \begin{array}{c} \cos \\ \sin \end{array} \left( \frac{n\pi y}{2b} \right) \right] e^{i\gamma_{mn}} \quad (3)$$

where m is the mode number relating to the field dependency along the x axis, n is the mode number relating to the field dependency along the y axis, z is the distance along the z axis, $\gamma_{mn} = (\beta_{mn} + i\alpha_{mn})$, the propagation constant of the $mn^{the}$ mode, $\beta_{mn}$ and $\alpha_{mn}$ being the $mn^{the}$ mode's phase and attenuation coefficients, and "cos" above "sin" indicates the former applies to mode numbers (m or n as appropiate) and the latter to even mode numbers.

The phase coefficient $\beta_{mn}$ is given by:

$$\beta_{mn} = \frac{2\pi}{\lambda} \left[ 1 - \left\{ \left( \frac{\lambda m}{4a} \right)^2 + \left( \frac{\lambda n}{4b} \right)^2 \right\} \right]^{\frac{1}{2}} \quad (4.1)$$

If the negative term in parentheses in Equation (4.1) is small compared with unity (paraxial radiation approximation), which is satisfied in practice, then the binomial theorem may be used to rewrite Equation (4.1) as:

$$\beta_{mn} = \frac{2\pi}{\lambda} \left[ 1 - \frac{1}{2} \left\{ \left( \frac{\lambda m}{4a} \right)^2 + \left( \frac{\lambda n}{4b} \right)^2 \right\} \right] \quad (4.2)$$

where a, b, m and n are as previously defined, and $\lambda$ is the free space wavelength of the radiation propagating in the waveguide.

Equation (3) sets out the electric field contributions obtainable from all linearly poloarized modes of a rectangular waveguide. It is calculated on the basis that the electric field contribution of each mode is zero at the side walls of the waveguide, i.e. at y = +b and −b, where y = 0 on the axis 24. This is satisfied if the central waveguide has reflecting side walls. Not all central waveguide modes are necessarily excited by a given input. In the case of the device 10 of FIGS 1 and 2, the heights of the input and beamsplitting waveguides 18 and 20 are matched and equal to 2a. The input waveguide 18 supplies an excitation in the form of its fundamental or lowest order mode $EH_{11}$. This is coupled to the various $EH_{mn}$ modes of the rectangular beamsplitting guide 20. The input $EH_{11}$ mode consequently becomes decomposed into a linear combination of the $EH_{mn}$ modes with respective complex multiplicative coefficients $A_{mn}$. This is expresses by:

$$EH_{11} = \Sigma A_{mn} \cdot EH_{mn} \quad (5)$$

Essentially the $A_{mn}$ amplitude coupling coefficients are the coefficients of a Fourier series which represents the field passing from the input waveguide into the beamsplitting waveguide 20. The $EH_{mn}$ modes are mutually orthogonal, and in consequence the coefficients $A_{mn}$ can be calculated from overlap integrals of the form:

$$A_{mn} = \int_{-b}^{+b}\int_{-a}^{+a} EH_{11} \cdot EH_{mn} \cdot dy \cdot dx. \quad (6)$$

The forms of some of the lower order $EH_{mn}$ waveguide modes are shown as electric field amplitude distributions in FIGS. 3A–3F. These were obtained by computation, and are shown as graphs 3A to 3F in quasi-three dimensional form. The coordinate axes are shown at 3G. The axes x, y and z correspond to transverse vertical, transverse horizontal and longitudinal directions in the multimode waveguide 20 as before. The graphs 3A to 3F correspond to modes as follows:
A:$EH_{11}$; B:$EH_{21}$; C:$EH_{31}$;
D:$EH_{12}$; E:$EH_{13}$; F:$EH_{22}$.
Of these, A, C and E are symmetric modes and B, D and F are antisymmetric modes. To clarify this, let $E(x)$ and $E(-x)$ respectively be the electrical field amplitude distributions associated respectively with positive and negative parts of the x axis in FIG. 1; $E(x=0)$ is on the z axis 24. Let $E(y)$ and $E(-y)$ be the equivalents for the y axis.

For a symmetric mode:

$$E(x)=E(-x) \text{ and } E(y)=E(-y) \quad (7.1)$$

For an antisymmetric mode, either one of or both of (7.2) and (7.3) below apply:

$$E(x)=-E(-x) \quad (7.2)$$

$$E(y)=-E(-y) \quad (7.3)$$

In the device 10, the fundamental mode input offset from the axis 24 provides for symmetric and antisymmetric modes of the multimode waveguide to be excited.

The transverse electric field distribution in an xy plane distant z from the input to the rectangular waveguide is $E_z$ given by:

$$E_z = \Sigma A_{mn} EH_{mn} \quad (8)$$

The field intensity distribution $I_z$ in xy planes distant z from the input to the rectangular waveguide is $|E_z|^2$, the square of the modulus or magnitude in Equation (8).

Figure 4A:
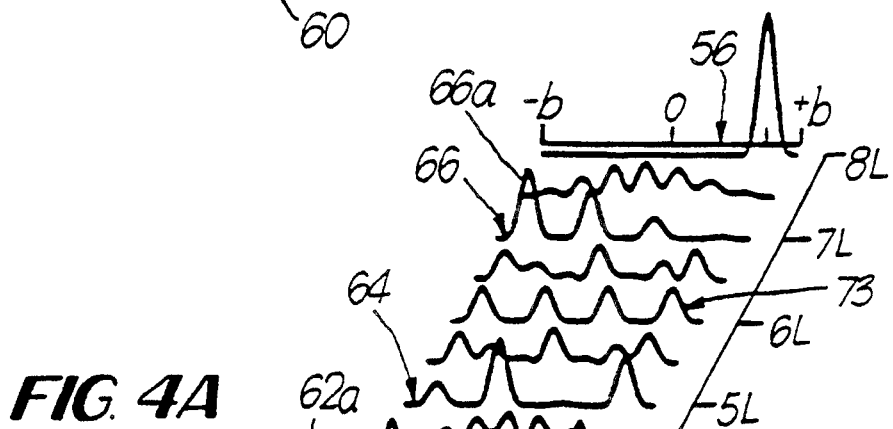

Referring now to FIG. 4A, there is shown a family of graphs of electric field intensity $I_z(y)$ as a function of y calculated for a multimode waveguide (not shown) of length 8 L. This waveguide has like cross-section to that of the beamsplitting waveguide 20. Coordinate axes 50 shown in FIG. 4C, a z axis scale 52 and y axis scales 54 and 56 indicate the waveguide disposition, and are rotated with respect to those in FIG. 1. The location $z=0$ and $y=0$ occurs at a point equivalent to 38 in FIG. 1, i.e. where a longitudinal waveguide axis intersects a waveguide wall associated with an input waveguide. The graphs appear at intervals L/2 apart on the z axis, e.g. graphs 58 and 60 at $z=0$ and $z=L$ respectively.

For clarity, the graph 60 is reproduced at FIG. 3. It has four maxima 60a (just discernable), 60b, 60c and 60d with relative magnitudes (intensities) 1, 4, 12 and 17 respectively, these being centred on y values $-3b/4$, $-b/4$, $+b/4$ and $+3b/4$. Between these maxima $I_z(y)$ goes to zero.

The graph 58 consists of a single maximum 58a centred at $y=-3b/4$ and zero values away from this maximum.

The intensity dividing device 10 operates as follows. The Gaussian profile laser beam waist at the left hand end of the input waveguide 18 excites the fundamental mode $EH_{11}$ of this waveguide. Very little of the laser radiation appears in higher order modes of the input waveguide 18. The division of the radiation intensities guided in various modes of the waveguide 18 are approximately $EH_{11}$ 98%, others 2%. In consequence, substantially only the fundamental $EH_{11}$ mode of the input waveguide 18 is excited. This passes along the input waveguide 18, and produces an inphase, half-cycle sinusoidal intensity distribution in the plane of the left hand waveguide wall 40. It is equivalent in shape, phase and location to the maximum 58a in FIG. 4A. It excites symmetric and antisymmetric modes $EH_{mn}$ (m=1, n=1, 2 ... ) of the beamsplitting waveguide 20, which operates multimode in the transverse horizontal y dimension. The latter operates in lowest (m=1) mode in the transverse vertical x dimension, since it is matched in size to the height of the input waveguide 18 supporting this mode.

The modes $EH_{1n}$ (n=1, 2, 3 ... ) propagate at different rates along the beamsplitting waveguide 20, i.e. modal dispersion occurs. In consequence, their phases vary relative to one another giving rise to interference. This produces variation in $I_z(y)$, as illustrated for a longer waveguide in FIG. 4A. At $z=L$ in the beamsplitting waveguide 20, intensity distributions equivalent to maxima 60a to 60d are produced. These intensity distributions are centred on the axes 28a to 28d respectively, and are located at the left hand ends of associated output waveguides 22a to 22d. They excite the fundamental modes $EH_{11}$ of the output waveguides 22, higher order modes being of negligible intensity. This produces relative intensities 1, 8, 17 and 24 at the right hand ends of the output waveguides 22a to 22d respectively. Expressing these relative intensities as percentages, the radiation intensity division is approximately 2%, 16%, 34% and 48%.

The intensity dividing device 10 consequently produces radiation division into a range of differing intensity outputs which are spatially separated. It therefore provides a choice of beam intensities without the need to employ a variable optical attenuator. It is particularly relevant to heterodyne light beating apparatus; here a low intensity light beam is required as a local oscillator signal. A high intensity light beam is also required for output to a test region, for subsequent reflection or scattering.

Figure 4C:
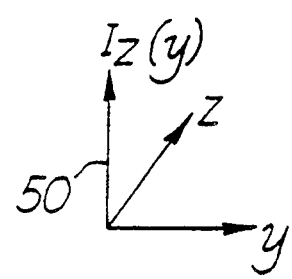

The device 10 offers a significant advantage over the prior art in that it requires relatively few modes to be supported in the rectangular waveguide 20. In particular the field distribution illustrated in FIGS. 4A–4C is substantially fully described by the seven lowest order EH modes, $EH_{11}$ to $EH_{17}$. Thus the device 10 will operate satisfactorily, as described above, provided the seven lowest order $EH_{1n}$ modes are supported by the waveguide 20.

To obtain light beam division into further numbers of intensities, the beams output from the output waveguides 22 may be selectively recombined. Moreover, these beams may be further divided by cascading a plurality of devices 10 connected in series.

Referring to FIGS. 4A–4C once more, further graphs 62, 64 and 66 are shown at z values 3 L, 5 L and 7 L respectively. These have respective maxima (e.g. 62a) of like intensity to those of the graph 60, but arranged in differing orders along the respective graphs. As before, they are located at y values $-3b/4$, $-b/4$, $+b/4$ and $+3b/4$. For example, the maxima of graph 66 are in inverse order compared to those of graph 60. This demonstrates that the order of maxima of differing intensities varies with distance z along a multimode waveguide employed in accordance with the invention. It can also be shown that the locations of these intensity distribution maxima along the y axis is variable by altering the position of the input maximum 58a. In particular, relocating the maximum 58a to a y value of $-b/4$, $+b/4$ or $+b/4$ would produce similar effects to those shown in FIG. 3, but maxima (e.g. 62a, 66a) on graphs 60 to 66 would be rearranged in position. These positions would still be at respective y values selected from $-3b/4$, $-b/4$, $+b/4$ and $3b/4$ and at z values L, 3 L, 5 L, and 7 L. In consequence, the positions of intensity maxima such as 60a on the graph 60 (z=L) may be altered by changing the location of the input maximum 58a from a y value of $-3b/4$ to $-b/4$, $+b/4$ or $+3b/4$. The input maximum 58a is located at the centre of a longitudinal subdivision (one quarter) of the multimode waveguide. It may be located at the centre of an Nth subdivision, in which case it will give rise to division into N maxima at z=L.

Devices similar to the device 10 may be constructed for different orders of beam division. In particular, if N beams each of different intensity are required, as in the device 10, then the following criteria may be met. Firstly the rectangular waveguide should be sufficiently wide for N output ports to be appropriately located to accept the required output maxima. That is each output waveguide should be of like cross-section to the input waveguide and should be located at the centre of an Nth subdivision of the waveguide width 2b. Secondly the length L, of the beamsplitting waveguide should be given by:

$$L = \frac{8b^2}{N\lambda} \quad (9)$$

Thirdly the input waveguide should be appropriately located. For all values of N a single fundamental mode input beam may be located at $y=\pm(N-1)b/N$. For some values of N other input locations may also be appropriate. For instance when N=4, as described earlier there are four appropriate locations $y=\pm(N-1)b/N$ and $y=\pm(N-3)b/N$.

Referring now to FIGS. 5(a)-5(e), there are shown families of graphs of electric field intensity $I_z(y)$ as a function of y calculated for a multimode waveguide, of width $2b=12a$. Each of the families (a) to (e) indicates division of a single input beam located $y=-(N-1)b/N$ into N maxima of different intensities at a length of $L=8b^2/N\lambda$, for N=6 to 2 respectively. Cartesian coordinates are used as before and relevant axes are indicated by 80 in FIG. 5(f).

In FIG. 5(a) (for which N=6) graph 82 represents an input radiation beam intensity distribution located at $y=-(N-1)b/N=-5b/6$. This input beam is a fundamental mode beam, and it excites both symmetric and antisymmetric modes of the rectangular waveguide. As these modes propagate along the waveguide in the z direction modal dispersion occurs. After a distance $z=8b^2/N\lambda=4b^2/3\lambda$, the dispersion produces an electric field distribution incorporating six maxima 84a to 84f (collectively 84) located at y values $-5b/6$, $-3b/6$, $-b/6$, $+b/6$, $+3b/6$ and $+5b/6$ respectively. The maxima 84 are each of a different intensity, the intensities ascending from 84a to 84f. As a percentage of input intensity, and to a first approximation, the intensities of 84a to 84f are 1%, 5%, 13%, 21%, 28% and 31% respectively.

Similarly for N=5, illustrated in FIG. 5(b), a single fundamental mode input beam located at $y=-4b/5$ is represented by graph 86. At a distance $z=8b^2/5\lambda$ five maxima 88a to 88e are produced. They are located at $y=-4b/5$, $-2b/5$, 0, $+2b/5$ and $+4b/5$, respectively. To a first approximation, their intensities, as a percentage of input intensity, are 88a 1%, 88b 8%, 88c 20%, 88d 32% and 88e 39%.

TABLE 1

| | Summary of beam division illustrated in FIG. 5 | | | | |
|---|---|---|---|---|---|
| | Input | | Output | | |
| N | Location | FIG. 5 Reference | Locations | FIG. 5 References | Intensities as % of input intensity |
| 6 | $-5b/6$ | 82 | $-5b/6$ $-3b/6$ $-b/6$ $+b/6$ $+3b/6$ $+5b/6$ | 84a to 84f | 1, 5, 13, 21, 28, 31. |
| 5 | $-4b/5$ | 86 | $-4b/5$ $-2b/5$ 0 $+2b/5$ $+4b/5$ | 88a to 88e | 1, 8, 20, 32, 39. |
| 4 | $-3b/4$ | 90 | $-3b/4$ $-b/4$ $+b/4$ $+3b/4$ | 92a to 92d | 2, 16, 34, 48. |
| 3 | $-2b/2$ | 94 | $-2b/3$ 0 $+2b/3$ | 96a to 96c | 4, 33, 62, |
| 2 | $-b/2$ | 98 | $-b/2$ $+b/2$ | 100a and 100b | 15, 85. |

The beam division illustrated in FIG. 5(a) and (b) is summarised in Table 1. Details of the beam division for N=4 to 2, illustrated in FIG. 5(c) to (d), is also given in Table 1.

Referring now to FIGS. 6(a)-6(f) there are shown six families of graphs of electric field intensity $I_z(y)$ as a function of y calculated for a multimode waveguide of width $2b=12a$. Each of the families 6(a) to 6(f) illustrates division of a single input beam, located at the centre of an Nth subdivision of the waveguide width, at a length of $L=8b^2/N\lambda=4b^2/3\mu$. Cartesian coordinates are used as before and relevant axes are indicated by 110 in FIG. 6(g).

In each of FIGS. 6(a) to 6(f) a single fundamental mode input beam is divided into six maxima located in the $z=4b^2/3\lambda$ plane at $y=-5b/6$, $-3b/6$, $-b/6$, $+b/6$, $+3b/6$ and $+5b/6$. FIG. 6(a) illustrates the same input beam location, at the centre of a first Nth subdivision, and beam division as illustrated in FIG. 5(a), and features are like referenced. FIG. 6(d) illustrates a fundamental mode input 112, located at z=0, y=−3b/6, that is in the centre of a second Nth subdivision. After a distance z=4b²/3λ six maxima 114a to 114f are produced. The maxima 114a, 114d and 114e are of one magnitude whilst the maxima 114b, 114c and 114f are of a second magnitude.

FIG. 6(c) illustrates a fundamental mode input 116 located, in the centre of a third Nth subdivision, at y=−b/6. After a distance z=4b²/3λ six maxima 118a to 118f (collectively 118) are produced. The maxima 118 are each of a different magnitude, these being like to the magnitudes of the maxima 84, but differently located. The following pairs of maxima have like magnitudes; 84a, 118c; 84b, 118e; 84c, 118a; 84d, 118f; 84e, 118b and 84f, 118d.

FIGS. 6(d) to 6(f) illustrate beam division when an input is located in fourth, fifth and sixth Nth subdivisions respectively. Due to the symmetry of excitation of the multimode waveguide FIGS. 6(d) to 6(f) are mirror images, each about the z-axis, of FIGS. 6(c), 6(b) and 6(a) respectively. They will therefore not be discussed in detail but are included for completeness.

FIGS. 6(a) to 6(g) illustrate that, for N=6, an input fundamental mode intensity distribution located at the centre of an Nth subdivision of the multimode waveguide width will result after a length L=8b²/Nλ in division into N maxima each located at the centre of an Nth subdivision. The N maxima will not all be of like magnitude. When the input location is ±(N−1)b²/Nλ or ±b²/Nλ then the N maxima will be of N different magnitudes.

Referring now to FIG. 7, there is shown a sectional plan view of a further embodiment of the invention indicated generally by 140. This embodiment is an electro-optically controlled intensity varying device. The device 140 is of alumina in which the following waveguides have been formed by milling (as described for the device 10):

(i) a square (2a×2a) transverse section input waveguide 142 of side 2a;
(ii) a rectangular (2a×2b) transverse section beamsplitting waveguide 144 of length L/2;
(iii) four square (2a×2a) transverse section phase control waveguides 146a to 146d (collectively 146) containing respective electro-optic phase shifters 148a to 148d (collectively 148);
(iv) an intensity control waveguide 150; and
(v) four square (2a×2a) transverse section output waveguides 152a to 152d (collectively 152).

Appropriate values for 2a and 2b are 1 mm and 4 mm respectively.

The device 140 has a longitudinal axis of symmetry 154, with which the input, beamsplitting and intensity control waveguides 142, 144 and 150 are coaxial. Each of the phase control waveguides 146 is coaxial with a respective one of the output waveguides 152; i.e. waveguides 146k and 152k share a respective common longitudinal symmetry axis 156k, where k=a, b, c or d. The axes 156a to 156d (collectively 156) are parallel to and coplanar with the device axis 154, but are offset from it transversely and horizontally by y values −b/4, −b/4, +b/4, +3b/4 respectively. A set of axes 158 indicates the y and z directions. The device axis 142 is the z axis, on which y=0.

The device 140 operates as follows. A $CO_2$ laser (not shown) excites substantially only the fundamental $EH_{11}$ mode of the input waveguide 142. This mode propagates to the beamsplitting waveguide 144, where it provides a coaxial fundamental mode excitation. It can be shown that this excitation generates only symmetric modes in the beamsplitting waveguide 144. As stated before, these modes are $EH_{mn}$ modes where m is 1 and n is odd. Because only symmetric modes are excited in the beamsplitting waveguide 144, it can be shown that four intensity distribuition maxima of equal magnitude are created at this waveguide's right hand end distant L/2 from the input. The maxima are centred on respective ones of the axes 156. They are well defined and separated by zero intensity regions, but are not of like phase. They excite fundamental modes of respective relay waveguides 146.

The phase shifters 148 have respective electrodes connected to DC bias voltage sources (not shown). They apply respective phase shifts to radiation propagating along respective relay waveguides 146.

Referring now also to FIGS. 4a–4c once more, there are shown four equal intensity maxima (with unlike phase) incorporated in graphs 71 at z=2 L and 73 at z=6 L. These respectively convert to graphs 62 and 66 of unequal intensity (equivalent to graph 60 with exchanged maxima) at z values of 3 L and 7 L. In consequence, four equal intensity maxima with appropriate phase differences are convertible to four maxima with differing intensities in a length L of multimode waveguide of 2a×2b cross-section.

This phenomenon is implemented in the device 140. Application of a series of sets of bias voltages to the phase shifters 148 produces a corresponding series of sets of intensity maxima at the output waveguides 152. Each maximum in a set is centred on a respective output waveguide 152. The sets differ only in that the order of size of their maxima differ. In FIGS. 4a–4c for example, graphs 60, 62, 64 and 66 have equivalent but differently ordered maxima such as 60a and 62a. Switching between bias voltage sets consequently produces electrically controlled switching of the respective intensities in the output waveguides 152. Moreover, since the device 140 employs modal dispersion for radiation intensity division, it is capable of high efficiency. To achieve high efficiency, the requirement is to provide low loss, accurately made waveguides 142 etc. Phase shifters 148 should be of negligible absorption, and should have antireflection coatings on longitudinal end surfaces through which radiation passes.

The output waveguides 152 may be connected to respective optical fibres to route individual radiation intensities to different regions.

Referring now to FIG. 8, there is shown a sectional plan view of a further embodiment of the invention indicated generally by 180. It is an intensity varying device. The device 180 incorporates a support 182 on which are mounted an input waveguide 184, first and second beamsplitters 186 and 188, and an output waveguide 190. Of these, the input and output waveguides 184 and 190 are fixed, and the remainder 186 and 188 are transversely moveable by respective first, second and third screws 192 and 194. The input and output waveguides 184 and 190 are formed as hollows in respective alumina blocks 184′ and 190′. The output waveguide block 190′ has carbon inserts 191.

The first beamsplitter 186 has four input coupling waveguides 200a to 200d, a bypass coupling waveguide 202 and an output coupling waveguide 204. The input and output coupling waveguides 200a to 200d (referred to collectively as 200) and the output coupling waveguide 204 are connected to a first beamsplitter multimode waveguide 206, which has an internal wall region 208 of graphite.

The second beamsplitter 188 has four input waveguides 210a to 210d and four output waveguides 212a to 212d, these being referred to collectively as 210 and 212 respectively. It also has a bypass waveguide 214. A second beamsplitter multimode waveguide 216 connects the input and output waveguides 210 and 212.

The waveguides 200 to 216 inclusive are formed as hollows in the material of which the beamsplitters 186 and 188 are made. The material is alumina with, in the case of the first beamsplitter 186, a carbon insert 208 as has been said.

The waveguides 184, 190, 200, 202, 204, 210, 212 and 214 are straight, and have square transverse cross-sections with side $2a$. They are collectively referred to as coupling waveguides, and are similar to waveguides 18 and 22 in FIG. 1. The multimode waveguides 206 and 216 have rectangular transverse cross-sections with sides $2a \times 2b$. They are similar to the waveguide 20 of FIG. 1.

The locations of the waveguides in each set 200, 210 or 212 with respect to y and z axes 217 are at y values $-3b/4$, $-b/4$, $+b/4$ and $+3b/4$. Here the z axis is along the centre of the input waveguide 184. Locations in the movable elements 186, 188 and 190 are measured from the z axis with the multimode waveguides 206 and 216 and the output waveguide 190 disposed symmetrically about that axis. The first beamsplitter output waveguide 204 is located at a y value of $+3b/4$. As indicated by longitudinal scales 220 and 222, the multimode waveguides 206 and 216 are of length L.

The device 180 operates as follows. The first screw 192 is adjusted to bring one of the first beamsplitter waveguides 200 and 202 into alignment with the input waveguide 184. As illustrated, waveguide 200d is aligned in this way. A $CO_2$ laser (not shown) is employed to excite the fundamental mode $EH_{11}$ of the input waveguide 186. Radiation from the laser is thereby relayed to whichever of the waveguides 200 and 202 has been aligned as described. If the bypass waveguide 202 is so aligned, substantially all of the input radiation is relayed to the second beamsplitter 188. This ignores minor radiation losses within waveguides or at interfaces 218 between adjacent elements. With one of the first beamsplitter input waveguides 200 so aligned, an intensity distribution having four maxima appears on the first multimode waveguide's right hand side 206'. The distribution is as in one of graphs 160 to 166 in FIGS. 4a-4c, and which of these is appropriate depends on which of the waveguides 200a to 200d is aligned with the input waveguide 184. Only one of the intensity maxima is located axially of the first beamsplitter output waveguide 204, and results in radiation being relayed to the second beamsplitter 188. The remaining maxima appear against the carbon block 208, which absorbs radiation therefrom.

Operation of the first screw 192 brings successive waveguides 200a to 200d into alignment with the input waveguide 184. It therefore superimposes successive maxima (see e.g. maxima 60a to 60d) of differing intensity on the first beamsplitter output waveguide 204. The combination of the beamsplitter 186 and screw 192 therefore acts as an intensity varying device. It allows for 2%, 16%, 34%, 48% or 100% of of the radiation from the input waveguide 84 to be relayed to the second beamsplitter 188 (ignoring intra-waveguide and interfacial losses).

Similar effects are implemented by the second beamsplitter 188, the operation of which will therefore be described briefly. Alignment of any one of the waveguides 210 or 214 with the input waveguide 184 (via the first beamsplitter 186) results in a further stage of division of radiation into maxima of differing intensity. Since the output waveguide 190 is fixed, operation of the screw 194 to align a second beamsplitter input waveguide 210 with the input and output waveguides 184 and 190 also produces alignment of an associated second beamsplitter output waveguide 212. In other words a pair of second beamsplitter input-output waveguides $210k$-$212k$ (where k = a, b, c or d) become aligned as described.

Alignment to the second beamsplitter input waveguide 210a is equivalent to maximum 58a in FIGS. 4a-4c. The associated beamsplitter output waveguide 212a receives an intensity maximum equivalent to 60a, because these are both located at y values corresponding to $-3b/4$. In consequence, about 2% of the radiation intensity input to the second beamsplitter 188 passes to the output waveguide 190. A similar reduction in intensity occurs if the other outer waveguide pair $210d/212d$ is selected.

If one of the inner beamsplitter input/output waveguide pairs $210b/212b$ or $210c/212c$ is selected, the relative intensity reaching the output waveguide 190 will be 48%.

The intensity reaching the output waveguide 190 will be 48% or 2% of that input to the second beamsplitter 188 according to which of the waveguides $210b$ to $210d$ is selected. Unwanted radiation output from non-selected waveguides 212 is absorbed in the carbon blocks 191.

The second beamsplitter 188 therefore provides a further intensity division stage with a choice of 2%, 48% or 100% (waveguide 214 aligned) of the radiation input to it. Such radiation has undergone like division in the first beamsplitter 188. In consequence, their combined effect provides radiation intensity variation in the output waveguide 190 from about 0.04% to 100% of that in the input waveguide 184 (ignoring losses).

For high power applications, the absorbing carbon blocks 191 and 208 may be inadequate. In this case the first beamsplitter 186 and the output waveguide block 190' may include reflectors and/or guides arranged to divert unwanted radiation to an absorption region.

An embodiment similar to the device 180 may be constructed with a fixed second beamsplitter and a transversely movable output waveguide (equivalent to 188 and 190 respectively). This would not have the advantage of the device 180 of fixed input and output locations 184/190, but would provide a greater number of intensity proportions.

Figure 9:
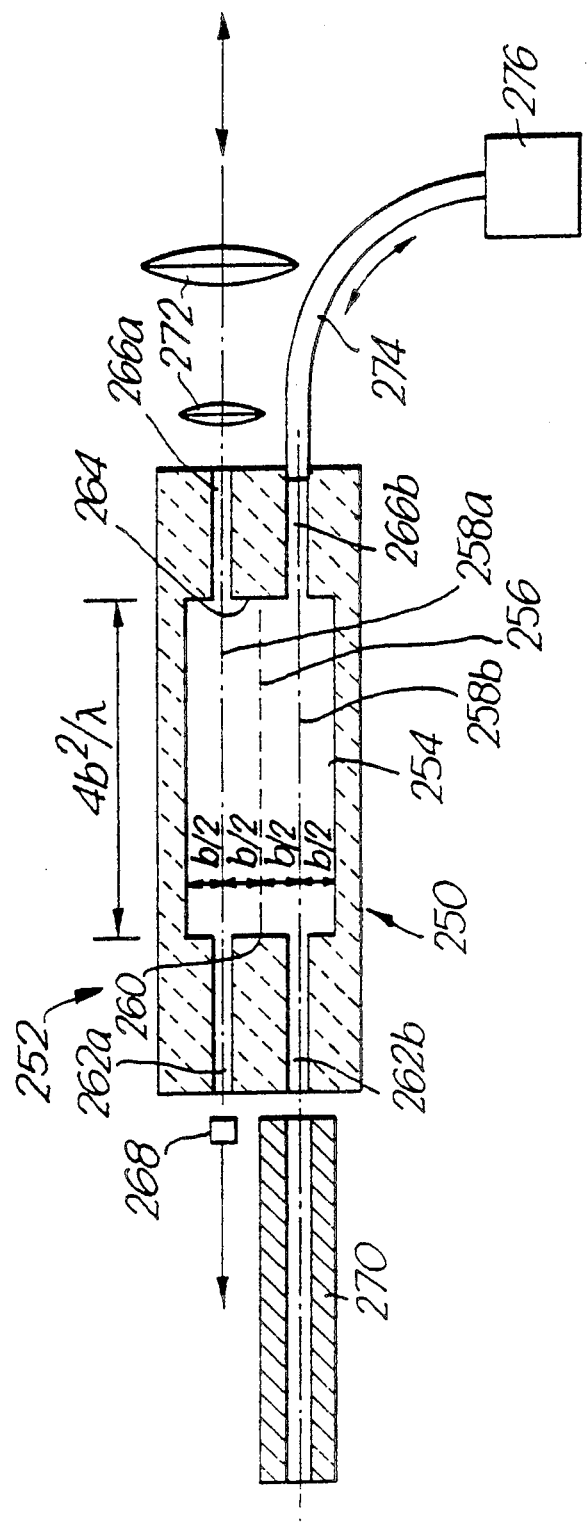
FIG. 9 is a schematic drawing of a device of the invention incorporated in a laser vibrometer.

Referring now to FIG. 9, there is shown a sectional plan view of a further embodiment of an intensity dividing device of the invention, this device being indicated by 250 and being part of a laser vibrometer indicate generally by 252. The device 250 incorporates a rectangular multimode waveguide 254 of cross-section $2a$ by $2b$ and length $4b^2/\lambda$, where $\lambda$ is an operating wavelength for radiation within waveguide 254. The waveguide 254 has a central axis 256 and two quartering axes 258a and 258b arranged centrally of respective longitudinal waveguide halves. The axes 256, 258a and 258b therefore delimit longitudinal quarters of the waveguide 254.

The rectangular waveguide 254 is connected at an end 260 to two subsidiary waveguides 262a and 262b, and at an output end 264 to two further subsidiary waveguides 266a and 266b. These subsidiary waveguides are of square cross section with side 2a, and are aligned with respective quartering axes 258a and 258b; ie subsidiary waveguide 262x/266x has a central axis along quartering axis 258x, where x is a or b.

A detector 268 and a laser 270 are aligned with the axes 258a and 258b respectively of input end subsidiary waveguides 262a/266a and 262b/266b. An optical telescope consisting of a lens pair 272 is aligned with upper output end subsidiary waveguide 266a. A fibre optic waveguide 272 is inserted into lower output end subsidiary waveguide 266b, and is connected to an acousto-optic modulator 276.

The vibrometer 252 operates as follows. Coherent radiation of wavelength $\lambda$ and frequency f is output by the laser 270 and is coupled into the fundamental mode of the lower input end subsidiary waveguide 262b. This radiation becomes asymmetrically divided in intensity by virtue of multimode propagation and modal dispersion within the rectangular waveguide 254. In consequence, ignoring losses, 85% of the input intensity passes into the upper output end subsidiary waveguide 266a, and then passes through the telescope 272 to a remote target zone (not shown). Radiation backscattered or retro-reflected from moving objects within the target zone undergoes a Doppler frequency shift $f_D$ (assumed negative for convenience) and returns to the upper output end waveguide 266a.

The lower output end waveguide 266b receives 15% of the intensity input to the rectangular waveguidew 254, and this intensity passes through the fibre optic waveguide 274 to the acousto-optic modulator 276. The modulator 276 provides a frequency decrement $f_M$ to the radiation frequency f, and returns a decreased frequency $(f-f_M)$ signal along the fibre optic waveguide 274 to the lower output end waveguide 266b.

The output end waveguides 266a and 266b consequently supply return radiation inputs of frequencies $(f-f_D)$ and $(f-f_M)$ respectively to the rectangular waveguide. The modulator 276 is arranged such that $f_M$ is greater than the maximum value of $f_D$ of interest. The return signals both provide contributions at the upper input end waveguide 262a due to modal dispersion during a return transit of the rectangular waveguide 254. These contributions vary in phase with respect to one another at a beat frequency $f_B$ given by:

$$f_B = (f-f_D)-(f-f_M) = f_M - f_D \quad (10)$$

In consequence radiation with intensity varying at a beat frequency $(f_M-f_D)$ becomes coupled to the fundamental mode of the upper input end subsidiary waveguide 262a and passes to the detector 268. Output signals pass to signal processing circuitry (not shown) in which a single value of $f_D$ of interest may be isolated or a Doppler spectrum of various values of $f_D$ may be analysed.

The vibrometer 252 may be employed to monitor motion such as vibrations of objects in the target zone.

I claim:

1. An intensity dividing device wherein:
    (A) the device includes:
        (a) a multimode waveguide,
        (b) at least one input port for relaying input radiation of a single wavelength and for exciting both symmetric and antisymmetric modes of the multimode waveguide, and
        (c) a set of output ports which are spaced apart across a transverse section of the multimode waveguide; and
    (B) the multimode waveguide and the input and output ports have geometries and a spatial relationship therebetween which in combination comprise a means for propagating input radiation as a fundamental mode to the multimode waveguide and, due to modal dispersion, for producing intensity distribution maxima of differing magnitude at respective output ports, each maximum being substantially a reproduction of the input radiation fundamental mode.

2. A device according to claim 1 wherein the input and output ports are apertures of input and output waveguides respectively.

3. A device according to claim 2 wherein the input, multimode and output waveguides have substantially parallel longitudinal axes.

4. An intensity dividing device wherein:
    (A) the device includes:
        (a) a multimode waveguide,
        (b) at least one input port for relaying input radiation of a single wavelength and for exciting both symmetric and antisymmetric modes of the multimode waveguide, and
        (c) a set of output ports which are spaced apart across a transverse section of the multimode waveguide; and
    (B) the multimode waveguide and the input and output ports have geometries and a spatial relationship therebetween which in combination comprise a means for propagating input radiation as a fundamental mode to the multimode waveguide and, due to modal dispersion, for producing intensity distribution maxima of differing magnitude at respective output ports, each maximum being substantially a reproduction of the input radiation fundamental mode
    wherein the input and output ports are apertures of input and output waveguides respectively, said input, multimode and output waveguides have substantially parallel longitudinal axes, and wherein:
        (a) the multimode waveguide is of rectangular transverse cross section with a first side of length 2a and a second side of length 2b;
        (b) the input and output waveguides are of square transverse cross-section with side 2a;
        (c) the output waveguides are connected to the multimode waveguide at spatially periodic positions across the latter's transverse cross-section;
        (d) the at least one input port and its associated waveguide are offset from a longitudinal axis of the multimode waveguide; and
        (e) the multimode waveguide provides an optical path of length L between the input and output ports where L is equal to $8b^2/N\lambda$, where N is the number of output ports and $\lambda$ is a wavelength of radiation for which the device is designed, the wavelength being that within the multimode waveguide.

5. A device according to claim 1, wherein the at least one input port is a plurality of input ports each arranged such that fundamental mode input radiation propagating to the multimode waveguide via the respective input port produces intensity distribution maxima of differing magnitude at respective output ports.

6. An intensity dividing device wherein:
    (A) the device includes:
        (a) a multimode waveguide,
        (b) at least one input port for relaying input radiation of a single wavelength and for exciting both symmetric and antisymmetric modes of the multimode waveguide, and
        (c) a set of output ports which are spaced apart across a transverse section of the multimode waveguide; and
    (B) the multimode waveguide and the input and output ports have geometries and a spatial relationship therebetween which in combination comprise a means for propagating input radiation as a fundamental mode to the multimode waveguide and, due to modal dispersion, for producing intensity distribution maxima of differing magnitude at respective output ports, each maximum being substantially a reproduction of the input radiation fundamental mode wherein the at least one input port is a plurality of input ports each arranged such that fundamental mode input radiation propagating to the multimode waveguide via the respective input port produces intensity distribution maxima of differing magnitude at respective output ports, and wherein:
        (a) each input port is connected to a respective input waveguide containing a respective phase shifting means;
        (b) the device includes means for providing the input waveguides with radiation beams of like intensities;
        (c) each phase shifting means is associated with control means operative to implement each of a set of phase shifts therein; and
        (d) the phase shifting means and control means are in combination arranged to provide for the output waveguides to receive selectable intensity magnitudes.

7. A device according to claim 6 wherein the providing means comprises a second multimode waveguide and input means arranged to excite only symmetric modes thereof.

8. An intensity dividing device wherein:
    (A) the device includes:
        (a) a multimode waveguide,
        (b) at least one input port for relaying input radiation of a single wavelength and for exciting both symmetric and antisymmetric modes of the multimode waveguide, and
        (c) a set of output ports which are spaced apart across a transverse section of the multimode waveguide, and
    (B) the multimode waveguide and the input and output ports have geometries and a spatial relationship therebetween which in combination comprise a means for propagating input radiation as a fundamental mode to the multimode waveguide and, due to modal dispersion, for producing intensity distribution maxima of differing magnitude at respective output ports, each maximum being substantially a reproduction of the input radiation fundamental mode wherein:
        (a) the multimode waveguide is a first such waveguide;
        (b) the at least one input port is a set of input ports equal in number to that of the set of output ports;
        (c) the device includes a second multimode waveguide having a set of input ports and an output port, and the second multimode waveguide is arranged to furnish input radiation to a selectable one of the input ports of the first multimode waveguide, the second multimode waveguide having intensity division characteristics like to those of the first such waveguide; and
        (d) the first and second multimode waveguides are relatively movable to apply two successive stages of selectable unequal intensity division to radiation propagating between a device input and a device output.

9. An intensity dividing device wherein:
    (A) the device includes:
        (a) a multimode waveguide,
        (b) at least one input port for relaying input radiation of a single wavelength and for exciting both symmetric and antisymmetric modes of the multimode waveguide, and
        (c) a set of output ports which are spaced apart across a transverse section of the multimode waveguide; and
    (B) the multimode waveguide and the input and output ports have geometries and a spatial relationship therebetween which in combination comprise a means for propagating input radiation as a fundamental mode to the multimode waveguide and, due to modal dispersion, for producing intensity distribution maxima of differing magnitude at respective output ports, each maximum being substantially a reproduction of the input radiation fundamental mode wherein:
        (a) the device has a detection port adjacent the input port,
        (b) the multimode waveguide has first and second output ports arranged respectively to relay radiation to a target zone and to local oscillator signal supplying means,
        (c) the first and second output ports are also arranged respectively to relay to the multimode waveguide radiation returning from the target zone and from the supplying means,
        (d) a source of coherent radiation is arranged to supply input radiation to the input port, and
        (e) the multimode waveguide is arranged to couple a relatively greater proportion of the input radiation intensity to the first output port and a relatively lesser proportion to the second output port, and is also arranged to provide for radiation returning both from the target zone and the generating means to give rise to a combined beat frequency signal at the detection port.

\* \* \* \* \*